Feb. 24, 1959     R. K. BOYER     2,874,750
VALVE STEM
Filed March 20, 1957
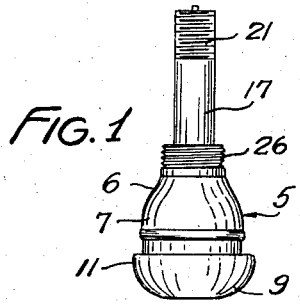
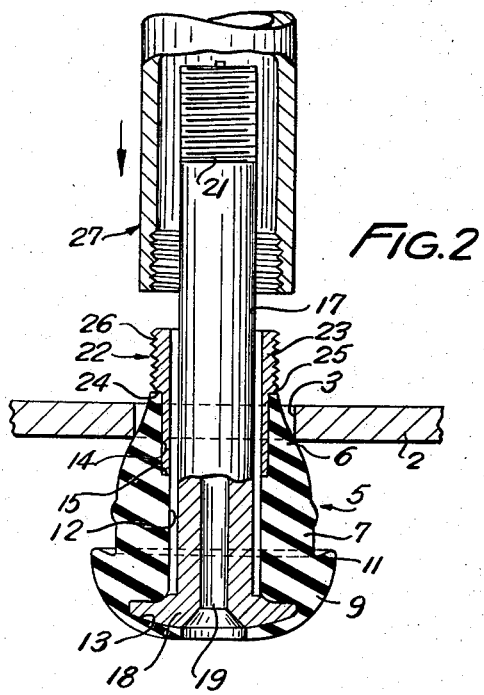
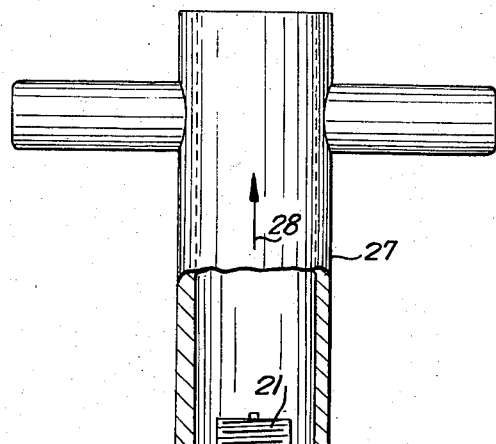
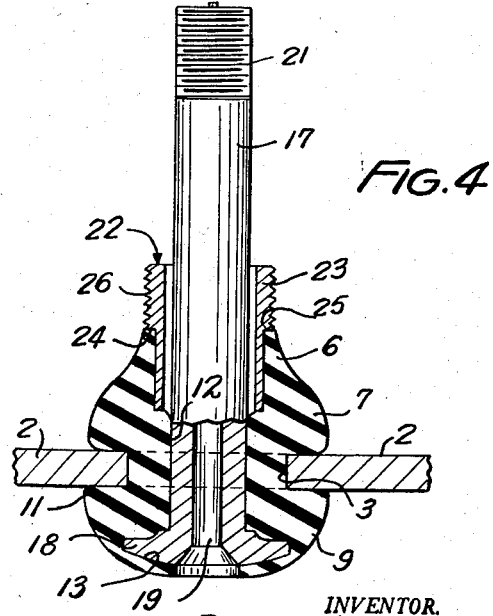
INVENTOR.
RALPH K. BOYER
BY Hudson, Boughton,
Williams, David & Hoffmann
ATTORNEYS United States Patent Office 2,874,750
Patented Feb. 24, 1959

2,874,750

VALVE STEM

Ralph K. Boyer, Cleveland, Ohio, assignor to The Dill Manufacturing Company, Cleveland, Ohio, a corporation of Ohio Application March 20, 1957, Serial No. 647,411

4 Claims. (Cl. 152—427)

This invention relates to a new and improved valve stem for use in connection with tubeless tires and more particularly is especially adapted for tubeless tire mountings for vehicles such as trucks or tubeless tires utilized in earth moving equipment or the like.

As is well known in the art, the valve stem for use with tubeless tires is normally mounted upon the rim and extends through the valve stem opening which is provided in the rim such that it is effective to cause an air tight seal when the tire is inflated and in service. However, in tubeless tire mountings for large vehicles as characterized above, the normal operating pressure of the tires is relatively greater than that utilized in the conventional passenger vehicle and the present day valve stems have been oftentimes found to be objectionable and in some instances wholly inoperative to maintain a necessary air-tight seal. For instance, where the vehicle is used on rough terrain such as in road construction, the sudden large impacts resulting from traveling thereon are effective to produce somewhat abnormal forces on the inner end of the valve stem whereby the latter is literally forced partially or completely out of the rim opening and the required air-tight seal therebetween is destroyed.

Therefore, a principal object of the present invention is to provide a new and improved valve stem for use in connection with a rim for mounting tubeless tires for large vehicles which is operative to compensate for the loss of resiliency of the valve stem body due to its aging and subsequent permanent set.

Another object of the present invention is the provision of a new and improved valve stem as characterized above and wherein the valve body includes a cylindrical insert having a portion substantially larger in diameter than the diameter of the rim opening and which is seated in said valve body adjacent the inner end of the rim and acts to prevent a transgression of said valve body outwardly through said opening.

Additional objects and advantages of the valve stem of the present invention will be realized by those versed in the art upon reference to the following description of a preferred embodiment and as shown in the accompanying drawings which form a part of this specification and wherein:

Fig. 1 is a view in vertical elevation of a valve stem embodying the present invention.

Fig. 2 is a vertical sectional view of the valve stem of Fig. 1 but shows the latter in its association with the opening in the rim prior to its insertion and with a tool embracing its outer end and adapted to be attached to the valve body for pulling the same into said rim opening.

Fig. 3 is a vertical sectional view which shows the valve stem being attached on its outer end to the tool and in the process of being stretched and inserted in the opening provided therefor in the rim; and Fig. 4 is a vertical sectional view of the valve stem and shows the position of the rubber valve body after it has been pulled into final position with respect to the rim opening.

Referring now to the drawings wherein like elements are designated by the same reference characters, the numeral 2 designates a portion of a rim for the mounting of a tubeless tire which is provided with the usual valve stem opening 3.

The valve stem of the present invention is adapted to be inserted into the opening 3 such that it engages the annular wall thereof to effect an air-tight seal therebetween and includes a body 5 preferably formed of a suitable rubber material and which, at its upper end is conical or tapered in configuration as is indicated at 6 which integrally connects to a medial cylindrical portion 7, the latter of which in turn, is connected on its opposite end to a substantially spherically-shaped head 9 defining an annular flange 11.

With reference to Fig. 2, the conical portion 6, before attachment to the rim, is shown to be less in diameter than the diameter of the opening 3 in the rim, whereas the cylindrical portion 7 is substantially greater in diameter than the diameter of the former. And similarly, the head portion 9 is substantially greater in diameter than the diameter of said cylindrical portion. The valve body is also centrally provided with a longitudinally extended opening 12, communicating adjacent its one end with an annular laterally extending recess or cavity 13. The opposite end of said opening is somewhat greater in diameter as shown at 14 providing an annular shoulder 15 intermediate the ends thereof.

A hollow cylindrical insert 17, preferably constructed of metal, is disposed in the opening 12, and as is shown in Fig. 2, is normally spaced radially inwardly of the annular walls thereof, and is integrally provided on its one end with an enlarged laterally extending head 18 adapted to seat in and substantially fill the cavity 13. The insert is normally mounted in the valve body during the molding of the latter such that positive adhesion is provided between the head 18 and the rubber material of said body immediately surrounding the same. The cylindrical insert is additionally provided centrally with a bore 19 adapted to receive a valve core or insides as will be well understood in the art, and is also externally provided on its end opposite to the head 18 with suitable threads 21 for receiving a conventional valve cap.

An elongated cylindrical sleeve or casing 22 is partially inserted into the enlarged diametrical portion 14 of the opening 12 of the valve body such that its one end seats upon the annular shoulder 15. The opposite end of said sleeve is provided with a relatively thicker wall at 23 defining a downwardly facing annular shoulder 24 which is adapted to seat upon the circular wall 25 on the end of said valve body adjacent the conical portion 6. The internal diameter of the sleeve or casing 22 is substantially the same as that of the medial portion of the opening 12 in the valve body 5 when the latter is in its free or unstretched position, whereby the cylindrical insert 17 is also spaced radially inwardly of said sleeve. The sleeve or casing is also mounted in the valve body during the molding thereof such that the annular shoulder 24 and the lower end thereof disposed in the enlarged portion 14 of the opening 12 is securely fastened or bonded to the valve body. The cylindrical sleeve or casing, at said opposite end is additionally provided with suitable external threads 26 adapted to receive the similarly threaded end of a tool 27, the purpose for which will be presently explained.

With the above construction it is now seen that only the enlarged head 18 of the cylindrical insert 17 is securely fastened or bonded to the rubber body of the valve stem. This is an important feature since it enables the rubber body to be stretched or elongated longitudinally along the insert to facilitate its disposition in the opening 3 of the rim 2.

In mounting the valve stem of the present invention to the rim 2, it is initially projected through the opening 3 from the inside of said rim as shown in Fig. 2 such that the cylindrical insert 17 and the threaded portion of the sleeve or casing 22 protrude centrally through said opening. The tool 27 is then placed over the insert and attached to the threaded end 26 of the cylindrical sleeve or casing 22 and a force is applied thereto in the direction of the arrow 28, as shown in Fig. 3, whereby the conical and cylindrical portions 6 and 7, respectively, of the rubber body 5 are stretched or elongated and pulled into the valve stem opening 3 and into substantial engagement with the wall of the latter. Said force is continued until the flange 11 on the head 9 is carried into engagement with the inner surface of the rim adjacent said valve stem opening and is then released whereby said portions tend to return to their original unstretched relative positions. However, since the part of the rubber body adjacent the head 9 is firmly confined in the opening 3 and presses outwardly against the annular walls thereof, said stretched portions will expand and overlie the outside surface of the rim surrounding said opening in the manner and form as is shown in Fig. 4. It is seen, therefore, that the aforesaid conical and cylindrical portions 6 and 7 are somewhat deformed relative to their original configuration which indicates that they are under a stress or, in other words, said stressed portions present a positively acting energy gradient which is effective to compensate for any aging of the rubber of the stem and to maintain an air-tight seal between it and the valve stem opening 3 of the rim.

As previously mentioned, only the enlarged head 18 of the cylindrical insert 17 is permanently bonded to the rubber valve body 5, and is substantially greater in diameter than the diameter of the opening 3 in the rim. Therefore, the sudden impacts resulting from the vehicle traveling over rough terrain and producing somewhat abnormal forces upon the inner end of the valve stem cannot force the latter out of the opening 3 in the rim. Additionally, the enlarged head 18 distributes said abnormal forces substantially equally throughout the lower portion of the valve stem whereby the annular stressed upper portions of said valve stem, as described hereinabove, exerting an energy gradient downwardly toward said inner end opposes said abnormal forces. And, since the latter are normally sustained over a very short functioning period, they are insufficient to cause displacement of said valve stem relative to the opening 3 and are thereby overcome and/or absorbed.

It is also realized that when the valve stem is inserted into the rim opening, as shown in Fig. 4, the medial portion of the valve body is displaced radially inwardly and presses against the peripheral surface of the insert on substantially both sides of the rim 2. Said insert is thereby resiliently held centrally in the valve body, and this relationship is an important feature. For instance, assuming that a glancing blow or impact is presented to the insert, it will tend to rock about the medial portion of the valve body in the direction of the applied impact, whereby diametrically opposed parts of said medial portion on opposite ends thereof will tend to be displaced toward and into the valve stem opening 3. And, since the part of the rubber valve body adjacent the head 9 is confined in the opening 3, said displaced portions will further overlie the oppositely diametrically opposed surfaces of the rim 2 and will be effective to more securely bind the valve stem in said opening.

Having thus described a preferred embodiment, it is believed the above enumerated objects and advantages in addition to others have been attained and it is also realized that the concepts of the present invention are susceptible of various modifications that are within the scope of the appended claims.

Having thus described my invention, what I claim is:

1. A valve stem for use with a rim for tubeless tires, which rim is provided with a standard valve stem opening, said stem having a body of rubber-like material, said body having a longitudinal opening therethrough, said body having intermediate its ends a portion of enlarged diameter, which diameter is greater than the diameter of the standard valve stem opening in the rim, and having thickened walls, a hollow insert occupying the longitudinal opening in the stem but slightly spaced from the wall of said longitudinal opening, said insert extending beyond the end of the said body, said insert having a laterally extending head portion of greater diameter than the valve stem opening in the rim, the said head portion being embedded in the body portion at the end thereof having the enlarged diameter, the body portion being provided with means to receive and secure a mounting tool, which tool is adapted to stretch the said body longitudinally along said hollow insert and move the enlarged diameter portion of the body so that it occupies the valve stem opening of the rim.

2. A valve stem for use with a tubeless tire mounting having a rim provided with a valve stem opening, comprising a body of rubber-like material having intermediate its ends a portion of enlarged diameter which is greater than the diameter of said valve stem opening, an opening provided centrally in said body extending longitudinally therethrough and communicating on its one end with an annular cavity, a hollow insert adapted to receive a valve core or insides occupying said longitudinally extending opening and normally spaced radially inwardly thereof throughout its length and provided on its one end with an enlarged laterally extending head adapted to interfit said cavity and of a diameter greater than the diameter of said valve stem opening and means carried by said body to enable a longitudinal force to be applied thereto to provide for the elongation of said body longitudinally along and relative to said insert and to effect the extension of said intermediate portion into said valve stem opening.

3. A valve stem for use with a tubeless tire mounting having a rim provided with a valve stem opening, comprising a body of rubber-like material having intermediate its ends a portion of enlarged diameter which is greater than the diameter of said valve stem opening, an opening provided centrally in said body extending longitudinally therethrough and communicating on its one end with an annular cavity, a hollow insert adapted to receive a valve core or insides occupying said longitudinally extending openings normally spaced radially inwardly thereof and provided on its one end with an enlarged laterally extending head of a diameter greater than the diameter of said valve stem opening and adapted to interfit said cavity and be secured therein to said body, and means secured to the end of said body opposite to said cavity to provide for the elongation of said body longitudinally along said insert and to effect the extension of said intermediate portion into said valve stem opening.

4. A valve stem for use with a tubeless tire mounting having a rim provided with a valve stem opening, comprising a body of rubber-like material having a medial portion of enlarged diameter which is greater than the diameter of said valve stem opening and a head portion on one end thereof which is greater in diameter than said medial portion, an opening provided centrally in said body extending longitudinally therethrough and communicating on its one end with an annular cavity, a hollow insert adapted to receive a valve core or insides occupying said longitudinally extending opening normally spaced radially inwardly thereof and provided on its one end with an enlarged laterally extending head of a diameter greater than the diameter of said valve stem opening and adapted to interfit said cavity and be secured therein to said body, and means on the end of said body opposite to said cavity to provide for the elongation of said body longitudinally along said insert to effect a radially inwardly directed displacement of said medial portion and into engagement with said hollow insert and to provide for the extension of said valve stem into said valve stem opening whereby the head of said body engages the mounting rim.

References Cited in the file of this patent

UNITED STATES PATENTS

| 2,021,259 | Magnuson | Nov. 19, 1935 |
| 2,507,680 | Rheude | May 16, 1950 |

FOREIGN PATENTS

| 201,902 | Australia | May 24, 1956 |